US010767528B2

(12) United States Patent
Hengst et al.

(10) Patent No.: US 10,767,528 B2
(45) Date of Patent: Sep. 8, 2020

(54) THREE-ZONE DIESEL OXIDATION CATLAYST

(71) Applicant: UMICORE AG & CO. KG, Hanau-Wolfgang (DE)

(72) Inventors: Christoph Hengst, Butzbach (DE); Franz Dornhaus, Hyogo (JP); Michael Schiffer, Hanau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 41 days.

(21) Appl. No.: 16/092,806

(22) PCT Filed: May 2, 2017

(86) PCT No.: PCT/EP2017/060350
§ 371 (c)(1),
(2) Date: Oct. 11, 2018

(87) PCT Pub. No.: WO2017/191099
PCT Pub. Date: Nov. 9, 2017

(65) Prior Publication Data
US 2019/0162095 A1 May 30, 2019

(30) Foreign Application Priority Data
May 2, 2016 (DE) .................. 10 2016 207 484

(51) Int. Cl.
*B01J 21/04* (2006.01)
*B01J 21/06* (2006.01)
(Continued)

(52) U.S. Cl.
CPC ......... *F01N 3/2066* (2013.01); *B01D 53/944* (2013.01); *B01D 53/9468* (2013.01);
(Continued)

(58) Field of Classification Search
CPC . B01J 21/04; B01J 21/06; B01J 21/063; B01J 21/08; B01J 21/12; B01J 23/02;
(Continued)

(56) References Cited

U.S. PATENT DOCUMENTS 5,120,695 A * 6/1992 Blumrich ........... B01D 53/8643
502/78
6,602,820 B1 8/2003 Goebel et al.
(Continued)

FOREIGN PATENT DOCUMENTS

DE 102004040549 A1 2/2006
DE 10 2012 025 746 A1 6/2015
(Continued)

OTHER PUBLICATIONS

Written Opinion of the International Searching Authority for International Patent Application No. PCT/EP2017/060350 dated Aug. 9, 2017 (10 pages in German with English translation).
(Continued)

*Primary Examiner* — Cam N. Nguyen
(74) *Attorney, Agent, or Firm* — Smith, Gambrell & Russell, LLP

(57) ABSTRACT

The invention relates to a diesel oxidation catalyst which has a support body with a length L extending between a first end face a and a second end face b and catalytically active material zones A, B, and C arranged on the support body, wherein—material zone A contains palladium or platinum and palladium in a weight ratio of Pt:Pd of ≤1 and an alkaline earth metal and extends over 20 to 80% of the length L starting from the end face a, material zone B contains ceroxide, is free of platinum, and extends over 20 to 80% of the length L starting from the end face b, material zone C contains platinum or platinum and palladium in a weight ratio of Pt:Pd of ≥5, and neither material zone A nor material zone C is arranged over material zone B.

14 Claims, 1 Drawing Sheet

(51) Int. Cl.

| | |
|---|---|
| B01J 21/08 | (2006.01) |
| B01J 21/12 | (2006.01) |
| B01J 23/02 | (2006.01) |
| B01J 23/10 | (2006.01) |
| B01J 23/40 | (2006.01) |
| B01J 23/42 | (2006.01) |
| B01J 23/44 | (2006.01) |
| B01J 23/58 | (2006.01) |
| B01J 23/63 | (2006.01) |
| B01J 35/00 | (2006.01) |
| B01D 53/94 | (2006.01) |
| F01N 3/035 | (2006.01) |
| F01N 3/10 | (2006.01) |
| F01N 3/20 | (2006.01) |
| B01J 37/02 | (2006.01) |
| B01J 35/04 | (2006.01) |

(52) U.S. Cl.
CPC ..... *B01D 53/9472* (2013.01); *B01D 53/9477* (2013.01); *B01J 23/58* (2013.01); *B01J 23/63* (2013.01); *B01J 35/0006* (2013.01); *B01J 37/024* (2013.01); *B01J 37/0244* (2013.01); *F01N 3/035* (2013.01); *F01N 3/101* (2013.01); *B01D 2255/1021* (2013.01); *B01D 2255/1023* (2013.01); *B01D 2255/204* (2013.01); *B01D 2255/2042* (2013.01); *B01D 2255/2063* (2013.01); *B01D 2255/2065* (2013.01); *B01D 2255/2092* (2013.01); *B01D 2255/20707* (2013.01); *B01D 2255/908* (2013.01); *B01D 2255/9022* (2013.01); *B01D 2255/9035* (2013.01); *B01D 2255/91* (2013.01); *B01D 2255/9202* (2013.01); *B01D 2257/404* (2013.01); *B01D 2257/502* (2013.01); *B01D 2258/012* (2013.01); *B01J 21/04* (2013.01); *B01J 21/063* (2013.01); *B01J 21/08* (2013.01); *B01J 35/04* (2013.01); *B01J 2523/00* (2013.01); *B01J 2523/24* (2013.01); *B01J 2523/25* (2013.01); *B01J 2523/3712* (2013.01); *B01J 2523/824* (2013.01); *B01J 2523/828* (2013.01); *F01N 2330/06* (2013.01); *F01N 2370/02* (2013.01); *F01N 2510/0684* (2013.01)

(58) Field of Classification Search
CPC ... B01J 23/10; B01J 23/40; B01J 23/42; B01J 23/44; B01J 23/58; B01J 23/63; B01J 35/0006; F01N 3/035; F01N 3/101; F01N 3/2066; B01D 53/944; B01D 53/9468; B01D 53/9472; B01D 53/9477
See application file for complete search history.

(56) References Cited

U.S. PATENT DOCUMENTS

| | | | |
|---|---|---|---|
| 8,007,750 B2 | 8/2011 | Chen et al. | |
| 8,293,182 B2 * | 10/2012 | Boorse | B01D 53/9468 422/180 |
| 8,431,186 B2 * | 4/2013 | Jeske | B01J 23/40 427/230 |
| 8,652,429 B2 * | 2/2014 | Sumiya | B01J 37/0244 423/213.2 |
| 8,667,785 B2 * | 3/2014 | Blakeman | B01J 23/42 60/299 |
| 9,005,559 B2 * | 4/2015 | Sumiya | B01J 21/12 423/213.2 |
| 9,527,036 B2 * | 12/2016 | Schiffer | B01D 53/9431 |
| 9,868,115 B2 * | 1/2018 | Sumiya | B01J 35/04 |
| 10,010,873 B2 | 7/2018 | Aoki | |
| 10,376,867 B2 * | 8/2019 | Blakeman | B01J 21/04 |
| 10,443,463 B2 * | 10/2019 | Hoyer | B01J 23/464 |
| 2003/0061860 A1 | 4/2003 | Hu et al. | |
| 2009/0137386 A1 | 5/2009 | Pfeifer et al. | |
| 2010/0058746 A1 * | 3/2010 | Pfeifer | B01D 53/9468 60/297 |
| 2010/0135879 A1 | 6/2010 | Roesch et al. | |
| 2010/0257843 A1 | 10/2010 | Hoke et al. | |
| 2010/0290964 A1 * | 11/2010 | Southward | B01J 37/0234 423/213.5 |
| 2011/0099975 A1 | 5/2011 | Bailey et al. | |
| 2011/0286900 A1 * | 11/2011 | Caudle | B01J 23/42 423/213.5 |
| 2012/0213674 A1 | 8/2012 | Schuetze et al. | |
| 2013/0089481 A1 | 4/2013 | Sumiya et al. | |
| 2013/0149221 A1 | 6/2013 | Blakeman et al. | |
| 2014/0130760 A1 | 5/2014 | Sumiya et al. | |
| 2015/0037233 A1 * | 2/2015 | Fedeyko | B01J 23/44 423/239.1 |
| 2015/0266014 A1 | 9/2015 | Xue et al. | |
| 2018/0029016 A1 * | 2/2018 | Sung | B01J 23/002 |

FOREIGN PATENT DOCUMENTS

| | | |
|---|---|---|
| DE | 11 2013 006 665 T5 | 11/2015 |
| EP | 1 101 528 A2 | 5/2001 |
| EP | 1 974 809 A1 | 10/2008 |
| EP | 2 000 639 A1 | 12/2008 |
| WO | 2006/021337 A1 | 3/2006 |
| WO | 2011/057649 A1 | 5/2011 |
| WO | 2012/079598 A1 | 6/2012 |
| WO | 2013/088133 A1 | 6/2013 |

OTHER PUBLICATIONS

International Preliminary Report on Patentability for International Patent Application No. PCT/EP2017/060350 dated Nov. 6, 2018 (11 pages in German with translation).
International Search Report for PCT/EP2017/060350, dated Aug. 9, 2017 in English and German Language (6 pgs.).
SAE International 2009-01-0627, "Impact and Prevention of Ultra-Low Contamination of Platinum Group Metals on SCR Catalysts Due to DOC Design", G. Cavatalo, et al. (13 pgs).

* cited by examiner

THREE-ZONE DIESEL OXIDATION CATLAYST

The present invention relates to an oxidation catalyst for purifying the exhaust gases of diesel engines.

In addition to carbon monoxide CO, hydrocarbons HC and nitrogen oxides $NO_x$, the raw exhaust of diesel engines contains a relatively high oxygen content of up to 15% by volume. Additionally, particulate emissions are included which predominantly consist of soot residues and in some cases organic agglomerates and result from a partially incomplete combustion of fuel in the cylinder.

While diesel particulate filters with and without catalytically active coating are suitable for removing the particle emissions, and nitrogen oxides can be converted to nitrogen, for example, by selective catalytic reduction (SCR) in a so-called SCR catalyst, carbon monoxide and hydrocarbons are rendered harmless by oxidation in a suitable oxidation catalyst.

Oxidation catalysts are extensively described in the literature. These are, for example, so-called flow-through substrates made of ceramic or metal material, which carry as essential catalytically active constituents noble metals, such as platinum and palladium, on high-surface area, porous, high-melting-point oxides, for example, aluminum oxide.

Already zoned oxidation catalysts are also described which have material zones of different composition in the direction of flow of the exhaust gas, with which the exhaust gas comes into contact in succession.

Thus, US2010/257843, US2011/099975, WO2006/021337 A1 and WO2012/079598 A1 describe zoned oxidation catalysts which contain platinum and palladium. WO 2011/057649 also describes oxidation catalysts, wherein they can be used in layered and zoned embodiments. In the case of the zoned embodiments, the second zone, i.e. the zone with which the outflowing exhaust gas is in direct contact, has a higher noble metal content than the front zone, which is in direct contact with the incoming exhaust gas. The oxidation catalysts according to WO2011/057649 have the particular task of setting an optimum ratio of NO to $NO_2$ for an exhaust-side SCR catalyst.

EP2000639A1 describes oxidation catalysts which contain, in addition to platinum, an oxide of a metal selected from magnesium, alkaline earth metal and alkali metal. The function of the catalyst is to increase the exhaust gas temperature during fuel injection.

WO 2013/088133 describes a zoned catalyst which contains platinum in the upstream zone and a metal oxide which is capable of binding the volatile platinum in the downstream zone. The catalyst should counteract the phenomenon described in SAE 2009-01-0627, according to which platinum-containing catalysts can deliver small amounts of platinum species into the gas phase at high temperatures, which in turn negatively influence the effectiveness of a downstream SCR catalyst. As metal oxides, stabilized aluminum oxide, amorphous aluminum/silicon oxide, optionally stabilized zirconium oxide, cerium oxide, titanium oxide, optionally stabilized cerium/zirconium mixed oxide and mixtures of the materials mentioned are disclosed. They are used in amounts of 6.1 to 305 g/L (from 0.1 to 5 g/in³).

The exhaust gas temperatures of current and future diesel engines of the exhaust gas legislation Euro 5, 6 and 6+ are getting increasingly lower due to fuel savings for lowering the $CO_2$ output. It is all the more important to have diesel oxidation catalysts which have a sufficient CO light off at low exhaust gas temperatures. The diesel oxidation catalysts known to date do not fulfill this condition sufficiently, so that there is a need for a corresponding further development.

It has now been found that the diesel oxidation catalysts described and defined below meet these conditions.

The present invention relates to a diesel oxidation catalyst comprising
a carrier body having a length L extending between a first end face a and a second end face b, and catalytically active material zones A, B and C arranged on the carrier body, wherein
  material zone A contains palladium or platinum and palladium in a weight ratio Pt:Pd of ≤1 and an alkaline earth metal and extends from end face a to 20 to 80% of length L,
  material zone B contains cerium oxide and is free of platinum and extends from end face b to 20 to 80% of length L, and
  material zone C contains platinum or platinum and palladium in a weight ratio Pt:Pd of ≥5, and
neither material zone A nor material zone C are arranged above material zone B.

If platinum and palladium are present in material zone A, the weight ratio Pt:Pd≤1. In embodiments of the present invention, the weight ratio Pt:Pd in material zone A is, for example, 1:1 to 1:15. If platinum and palladium are present in the material zone C, the weight ratio Pt:Pd≥5. In embodiments of the present invention, the weight ratio Pt:Pd in material zone C is, for example, 5:1 to 12:1.

In embodiments of the oxidation catalyst according to the invention, palladium, platinum or platinum and palladium are applied in the material zones A and C on one or more carrier oxides. These carrier oxides are advantageously high-melting, i.e. their melting point is sufficiently above the temperatures occurring during the intended operation of the oxidation catalyst according to the invention. The carrier oxides are also advantageously of high surface area and preferably have specific surfaces of 50 to 200 m²/g.

The carrier oxides in the material zones A and C may be identical or different.

Suitable carrier oxides are selected from the series consisting of aluminum oxide, doped aluminum oxide, silicon oxide, titanium dioxide and mixed oxides of one or more thereof. Doped aluminum oxides are, for example, aluminum oxides doped with zirconium oxide and/or titanium oxide. Lanthanum-stabilized aluminum oxide is advantageously used, wherein lanthanum is used in amounts of from 1 to 10% by weight, preferably from 3 to 6% by weight, each calculated as $La_2O_3$ and relative to the weight of the stabilized aluminum oxide.

In embodiments of the oxidation catalyst according to the invention, magnesium, calcium, strontium, barium or mixtures of at least two of these metals are used as alkaline earth metal in material zone A. Strontium or barium is preferably used.

The alkaline earth metal is advantageously used in an amount of 0.5 to 5% by weight relative to the weight of the material zone A.

When strontium is used, it is particularly preferably present in an amount of from 1 to 3% by weight relative to the weight of the material zone A.

In contrast, if barium is used, it is particularly preferably present in an amount of 2.5 to 4.5% by weight relative to the weight of the material zone A.

In embodiments of the oxidation catalyst according to the invention, the cerium oxide is partially replaced by aluminum oxide in material zone B. It is possible to use mixtures of cerium oxide and aluminum oxide which comprise aluminum oxide in amounts of from 10 to 90% by weight relative to the weight of the mixture of aluminum and cerium oxide. Preferably pure cerium oxide, i.e., cerium oxide with a cerium oxide content of 80 to 100% by weight, is used as the cerium oxide.

The usual high-surface-area aluminum oxides, such as are also used as carrier oxides in the material layers A and C, can serve as aluminum oxide.

In further embodiments of the oxidation catalyst according to the invention, the material zone B contains palladium. Preferred amounts of the palladium are from 0.01 to 5% by weight, preferably from 2 to 4% by weight, relative to the weight of the material zone B.

The palladium is carried in particular on the cerium oxide present in material zone B. However, it can also be carried completely or partially on standard carrier oxides, wherein in particular the carrier oxides described above for platinum and palladium in the material zones A and C, in particular also aluminum oxide, come into consideration.

In embodiments of the oxidation catalyst according to the invention, the material zones A and C are present independently of one another in amounts of from 50 to 150 g/L relative to the volume of the carrier body. Material zone B is preferably present in amounts of from 50 to 150 g/L relative to the volume of the carrier body.

In embodiments of the oxidation catalyst of the present invention, the length of material zone A is 20 to 70%, 40 to 60%, or 45 to 50% of the overall length L of the carrier body.

In further embodiments of the oxidation catalyst according to the invention, the length of the material zone B is 20 to 70%, 40 to 60% or 45 to 50% of the overall length L of the carrier body. In embodiments of the oxidation catalyst according to the invention, the material zone C extends over the entire length L of the carrier body. However, it can also extend only over part of the overall length L of the carrier body, for example 20 to 70%, 40 to 60% or 45 to 50% of the overall length L of the carrier body.

In embodiments of the oxidation catalyst according to the invention,
material zones A and B are arranged on material zone C. Material zone C preferably extends over the entire length L of the carrier body, while the material zones A and B each extend over 40 to 60% of the overall length L of the carrier body. The sum of the lengths of the material zones A and B corresponds to or is smaller than the overall length L of the carrier body.

In these embodiments, the material zones A and B particularly preferably extend in each case to 50% and material zone C to 100% of the length L of the carrier body.

In embodiments of the oxidation catalyst according to the invention, material zone C is arranged on material zone A and material zone B is arranged on material zone C. In this case as well, the material zone C preferably extends over the entire length L of the carrier body, while the material zones A and B each extend over 40 to 60% of the overall length L of the carrier body. The sum of the lengths of the material zones A and B corresponds to or is smaller than the overall length L of the carrier body.

In these embodiments, the material zones A and B particularly preferably extend in each case to 50% and material zone C to 100% of the length L of the carrier body.

Oxidation catalysts according to the invention can be produced by coating suitable carrier bodies in a manner known per se by means of coating suspensions, so-called washcoats. To produce a coating suspension for producing the material zones A or C, the selected carrier oxides are suspended in water, for example. Platinum and/or palladium are then added to the suspension with stirring in the form of suitable, water-soluble precursor compounds, such as palladium nitrate or hexahydroxoplatinic acid, for example, and optionally fixed on the carrier material by setting the pH and/or by adding an auxiliary reagent.

Alternatively, the noble metal may also be applied to the carrier material in a manner analogous to the method described in EP 1,101,528 A2.

The suspensions obtained in this way are then ground and applied to the carrier body by one of the standard coating methods. After each coating step, the coated part is dried in a hot air stream and in some cases with a calcination.

The aforementioned precursors and auxiliary reagents are well known to those skilled in the art.

So-called honeycomb bodies made of ceramic, in particular cordierite, or of metal are particularly suitable as carrier bodies. So-called flow-through honeycomb bodies are preferably used. However, embodiments are also conceivable in which wall-flow filters are used as carrier bodies.

The diesel oxidation catalysts according to the invention are suitable for purifying the exhaust gases of diesel engines, in particular with regard to carbon monoxide and hydrocarbons. The present invention thus also relates to a method for the treatment of diesel exhaust gases, which is characterized in that the diesel exhaust gas is conducted through a diesel oxidation catalyst as described and defined above, wherein the diesel exhaust gas flows into the carrier body at the end face a and flows out of the carrier body at the end face b.

The diesel oxidation catalysts according to the invention are used in particular as constituents of exhaust gas purification systems. In addition to a diesel oxidation catalyst according to the invention, corresponding exhaust gas purification systems include, for example, a diesel particulate filter and/or a catalyst for selective catalytic reduction of nitrogen oxides, wherein diesel particulate filter and SCR catalyst are usually arranged downstream of the diesel oxidation catalyst according to the invention, that is on the outflow side. In one embodiment of the emission control system, the SCR catalyst is arranged on the diesel particulate filter.

FIG. 1 shows a comparison of the heat-up behavior of Examples 1 to 3 and Comparative Examples 1 to 3.

EXAMPLE 1 a) A commercially available round flow-through substrate of cordierite of dimensions 14.38 cm×10.16 cm (5.66"× 4.00") with a cell density of 62 cells per square centimeter (400 cpsi) and wall thickness 0.16 mm (6.5 mil) was coated over its entire length with a washcoat containing 49.23 g/L of a lanthanum-doped mesoporous aluminum oxide, 0.60540 g/L of a standard water-soluble Pt compound, and 0.10090 g/L of a standard water-soluble Pd compound. The Pt:Pd weight ratio was 6:1.

b) The coated substrate obtained according to a) was coated from one end (inlet side in the tests described below) to 50% of its length with a washcoat containing 48.23 g/L of a commercially available lanthanum-doped aluminum oxide, 1.00 g/L strontium oxide (ex Sr(OH)2), 0.47086 g/L of a standard water-soluble Pd compound, and 0.23543 g/L of a standard water-soluble Pt compound. The Pt:Pd weight ratio was 1:2.

c) In a further step, the substrate obtained according to b) was coated, starting from the other end (in the tests described below on the outlet side), to 50% of its length with a washcoat containing 45 g/L of a commercially available aluminum oxide and 5 g/L of a commercially available cerium oxide.

COMPARATIVE EXAMPLE 1

Example 1 was repeated with the difference that step c) was omitted.

COMPARATIVE EXAMPLE 2

Example 1 was repeated with the difference that step b) was omitted.

COMPARATIVE EXAMPLE 3 a) A commercially available flow-through substrate of cordierite having dimensions 14.38 cm×10.16 cm (5.66"×4.00") with a cell density of 62 cells per square centimeter (400 cpsi) and wall thickness 0.16 mm (6.5 mil) was coated over its entire length with a washcoat containing 73.85 g/L of a lanthanum-doped mesoporous aluminum oxide, 0.90810 g/L of a standard water-soluble Pt compound, and 0.15135 g/L of a standard water-soluble Pd compound. The Pt:Pd weight ratio was 6:1.

b) In a further step, the substrate obtained according to a) was coated from one end (outlet side in the tests described below) to 50% of its length with a washcoat containing 45 g/L of a commercially available aluminum oxide and 5 g/L of a commercially available cerium oxide.

EXAMPLE 2 a) A commercially available flow-through substrate of cordierite with dimensions of 14.38 cm×10.16 cm (5.66"×4.00") with cell density of 62 cells per square centimeter (400 cpsi) and wall thickness 0.16 mm (6.5 mils) was coated from one end (in the tests described below on the inlet side) over 50% of its length with a washcoat containing 48.23 g/L of a commercially available lanthanum doped aluminum oxide, 1.00 g/L strontium oxide (ex $Sr(OH)_2$), 0.47086 g/L of a standard water-soluble Pd compound, and 0.23543 g/L of a standard water-soluble Pt compound. The Pt:Pd weight ratio was 1:2.

b) The coated substrate obtained according to a) was coated over its entire length (i.e., on the inlet side on the zone according to a), on the outlet side directly on the carrier substrate) with a washcoat containing 49.23 g/L of a commercially available lanthanum-doped aluminum oxide, 1.00 g/L strontium oxide (ex $Sr(OH)2$), 0.47086 g/L of a standard water-soluble Pd compound, and 0.23543 g/L of a standard water-soluble Pt compound. The Pt:Pd weight ratio was 1:2.

c) In a further step, the substrate obtained according to b) was coated, starting from the other end (in the tests described below on the outlet side) to 50% of its length, i.e. on the zone according to a) with a washcoat containing 45 g/L of a commercially available aluminum oxide and 5 g/L of a commercially available cerium oxide.

EXAMPLE 3

A commercially available flow-through substrate of cordierite of dimensions 14.38 cm×10.16 cm (5.66"×4.00") with a cell density of 62 cells per square centimeter (400 cpsi) and wall thickness 0.16 mm (6.5 mil) was sawn into three parts of equal length.

The three parts were each coated over their entire length with the washcoat materials mentioned in Examples 1 a), b) and c).

For the tests described below, the three substrate parts were joined together in the direction of the flowing exhaust gas in the order:
1st part coated with washcoat according to Example 1 b)
2nd part coated with washcoat according to Example 1 a)
3rd part coated with washcoat according to Example 1 c)
Carrying Out Comparative Tests
a) Hydrothermal Furnace Aging The catalysts according to Examples 1 to 3 and Comparative Examples 1 to 3 were aged at 750° C. for 16 hours. The comparative tests described below were carried out with the catalysts aged in this way, unless stated otherwise.

b) Determination of the $NO_2$ Formation and the CO Conversion in the Model Gas; for all Measurements, the Following Items Apply:
Space velocity=37,500 1/h
Bore core dimension 2.54 cm×10.16 cm (1"×4") (bored from substrates according to Examples 1 to 3 and Comparative Examples 1 to 3)
Investigated temperature range: 75° C. to 500° C., wherein the values at the temperatures 200, 250 and 300° C. are documented in the tables below.
Ramp/heating rate=15 K/min Tests were carried out with three different gas compositions:

| | Test conditions: | | |
|---|---|---|---|
| | 1 | 2 | 3 |
| | Unit | | |
| | [ppm] | [ppm] | [ppm] |
| CO | 350 | 250 | 500 |
| H2 | 116 | 0 | 167 |
| Propene as C3 | 60 | 0 | 200 |
| Propane as C3 | 30 | 0 | 67 |
| Toluene as C7 | 0 | 0 | 8.6 |
| N-decane as C10 | 0 | 0 | 14 |
| NO | 270 | 750 | 150 |
| | Unit | | |
| | [%] | [%] | [%] |
| O2 | 6 | 10 | 13 |
| H2O | 5 | 7.5 | 10 |
| CO2 | 10.7 | 7 | 5 |
| N2 | Rest | Rest | Rest |

The following results were obtained:

TABLE 1

$T_{50}$CO and $NO_2$ formation under test conditions 1

| | Test conditions 1 | | | |
|---|---|---|---|---|
| | $T_{50}$CO [° C.] | $NO_2$@200° C. [%] | $NO_2$@250° C. [%] | $NO_2$@300° C. [%] |
| Example 1 | 150 | 15 | 28 | 44 |
| Comparative example 1 | 149 | 17 | 34 | 49 |
| Comparative example 2 | 155 | 18 | 33 | 50 |

TABLE 1-continued

T$_{50}$CO and NO$_2$ formation under test conditions 1

| | Test conditions 1 | | | |
|---|---|---|---|---|
| | T$_{50}$CO [° C.] | NO$_2$@200° C. [%] | NO$_2$@250° C. [%] | NO$_2$@300° C. [%] |
| Comparative example 3 | 152 | 19 | 35 | 55 |
| Example 2 | 151 | 16 | 29 | 45 |
| Example 3 | 153 | 14 | 28 | 41 |

TABLE 2

T$_{50}$CO and NO$_2$ formation under test conditions 2

| | Test conditions 2 | | | |
|---|---|---|---|---|
| | T$_{50}$CO [° C.] | NO$_2$@200° C. [%] | NO$_2$@250° C. [%] | NO$_2$@300° C. [%] |
| Example 1 | 168 | 15 | 26 | 39 |
| Comparative example 1 | 166 | 18 | 30 | 45 |
| Comparative example 2 | 173 | 16 | 27 | 42 |
| Comparative example 3 | 170 | 19 | 29 | 48 |
| Example 2 | 168 | 14 | 25 | 38 |
| Example 3 | 171 | 4 | 25 | 36 |

TABLE 3

T$_{50}$CO and NO$_2$ formation under test conditions 3

| | Test conditions 3 | | | |
|---|---|---|---|---|
| | T$_{50}$CO [° C.] | NO$_2$@200° C. [%] | NO$_2$@250° C. [%] | NO$_2$@300° C. [%] |
| Example 1 | 171 | 5 | 16 | 30 |
| Comparative example 1 | 168 | 8 | 22 | 38 |
| Comparative example 2 | 172 | 7 | 19 | 35 |
| Comparative example 3 | 168 | 8 | 20 | 38 |
| Example 2 | 170 | 4 | 14 | 26 |
| Example 3 | 170 | 0 | 15 | 28 | c) Determination of the NO$_2$ Formation and the CO Conversion in the Engine Light-Off Test:

By raising the torque at a constant rotational speed of the engine, an increase in the precatalyst temperature is achieved; the test runs from low to high temperatures, analogous to the model gas procedure.

The conversion of the pollutants is measured by AMA lines and calculated; the NO$_2$ formation is determined by means of a CLD.

The following results were obtained:

TABLE 4

T$_{50}$CO and NO$_2$ formation on engine

| | T$_{50}$CO [° C.] | NO$_2$max [%] | NO$_2$@300° C. [%] |
|---|---|---|---|
| Example 1 | 157 | 19 | 25 |
| Comparative example 1 | 160 | 23 | 20 |
| Comparative example 2 | 169 | 22 | 17 |
| Comparative example 3 | 160 | 25 | 22 |

TABLE 4-continued

T$_{50}$CO and NO$_2$ formation on engine

| | T$_{50}$CO [° C.] | NO$_2$max [%] | NO$_2$@300° C. [%] |
|---|---|---|---|
| Example 2 | 159 | 33 | 32 |
| Example 3 | 157 | 18 | 15 | d) Determination of the Heat-Up Behavior in the Engine Test (3-Point-Heat-Up Test):

A stationary engine operating point is approached by a suitable combination of torque and rotational speed. This is kept constant for a certain time; diesel fuel is then injected in a finely nebulized state upstream of the catalyst via a secondary/external injector, which then converts the fuel and thus generates a certain exotherm/heat, which is measured by means of thermocouples installed in the catalyst.

The test is run from high to low temperatures; the temperatures are:
1) 280° C. precatalyst temperature
2) 270° C. precatalyst temperature
3) 260° C. precatalyst temperature.

The results are shown in FIG. 1.

e) Determination of Platinum Migration

The catalysts used in Examples 1 to 3 and Comparative Examples 1 to 3 were subjected in a fresh state to a model gas of the following composition in a standard synthesis gas plant with isothermal reactor at a constant temperature of 650'C for 18 hours:

CO 71 ppm
NO 820 ppm
O$_2$ 6.3 volume percent
CO$_2$ 8.9 volume percent
H$_2$O 11 volume percent in the measurements lasting 18 hours, and 5 volume percent in the measurements lasting 60 hours
N$_2$ Balance The gas leaving downstream of the respective catalyst was guided through a flow-through substrate having a length of 5.08 cm (2") and coated with an SCR catalyst of the iron-β-zeolite type.

The amount of platinum bound in the SCR catalyst was then determined for each catalyst. To this end, a drilling core of the catalyst was melted in a crucible by means of an NiS fire assay, and the platinum was then determined by means of ICP-OES.

The following results were obtained:

| | Amount of platinum [ppm] |
|---|---|
| Example 1 | 1.2 |
| Comparative example 1 | 3.0 |
| Comparative example 2 | 0.3 |
| Comparative example 3 | 0.9 |
| Example 2 | 0.4 |
| Example 3 | 0.4 |

The invention claimed is:
1. A diesel oxidation catalyst, comprising
a carrier body having a length L extending between a first end face a and a second end face b, and catalytically active material zones A, B and C arranged on the carrier body, wherein material zone A contains palladium or platinum and palladium in a weight ratio Pt:Pd of ≤1 and an alkaline earth metal and extends from end face a to 20 to 80% of length L, material zone B contains cerium oxide and is free of platinum and extends from end face b to 20 to 80% of length L, and material zone C contains platinum or platinum and palladium in a weight ratio Pt:Pd of ≥5, and neither material zone A nor material zone C are arranged above material zone B.

2. The Diesel oxidation catalyst according to claim 1, wherein in the material zones A and C palladium, platinum or platinum and palladium are present on a carrier oxide.

3. The diesel oxidation catalyst according to claim 1 wherein the carrier oxides in material zones A and C are identical or different from one another and are selected from the group consisting of aluminum oxide, doped aluminum oxide, silicon oxide, titanium dioxide and mixed oxides of one or more thereof.

4. The diesel oxidation catalyst according to claim 1, wherein the alkaline earth metal in material zone A is present in an amount of 0.5 to 5% by weight relative to the weight of the material zone A.

5. The diesel oxidation catalyst according to claim 1, wherein the alkaline earth metal in material zone A is strontium or barium or strontium and barium.

6. The diesel oxidation catalyst according to claim 1, wherein material zone B contains palladium.

7. The diesel oxidation catalyst according to claim 6, wherein material zone B contains palladium in an amount of 0.01 to 5% by weight relative to the weight of material zone B.

8. The diesel oxidation catalyst according to claim 1, wherein material zone C extends over the entire length L of the carrier body.

9. The diesel oxidation catalyst according to claim 1, wherein material zones A and B are arranged on material zone C.

10. The diesel oxidation catalyst according to claim 1, wherein material zone C is arranged on material zone A and material zone B is arranged on material zone C.

11. The diesel oxidation catalyst according to claim 1, wherein material zones A and B each extend to 50% and material zone C to 100% of the length L of the carrier body.

12. A method for treating diesel exhaust gases, wherein the diesel exhaust gas is conducted through a diesel oxidation catalyst according to claim 1, wherein the diesel exhaust gas flows into the carrier body at the end face a and flows out of the carrier body at the end face b.

13. A device for purification of exhaust gases from diesel engines having a diesel oxidation catalyst according to claim 1.

14. The device according to claim 13, wherein the diesel oxidation catalyst is arranged upstream of a diesel particle filter and/or a catalyst for selective catalytic reduction of nitrogen oxides.

* * * * *